United States Patent Office 3,567,700
Patented Mar. 2, 1971

3,567,700
SHORT STOPPING SYNTHETIC RUBBER POLYMERIZATION
Harry Elmer Albert and Paul Gordon Haines, Lafayette Hill, Pa., assignors to Pennwalt Corporation
No Drawing. Filed May 13, 1968, Ser. No. 728,806
Int. Cl. C08f 1/13; C08d 1/09, 1/36
U.S. Cl. 260—84.3          5 Claims

ABSTRACT OF THE DISCLOSURE

A process for shortstopping polymerizations, particularly polymerization processes for making synthetic rubber latices such as butadiene-styrene copolymers where the short stopping agent is diethylaniline N-oxide.

Synthetic rubber latices are prepared commercially by emulsion polymerization of rubber forming monomers and the polymerization must be stopped to get a product of the desired optimum characteristics. Much study has been made toward finding good short-stops and numerous compounds have been found quite useful. However, the compounds used heretofore have certain disadvantages and are not generally satisfactory with all types of polymerization systems. Hydroquinone, for example, has been used in hot butadiene-styrene systems, but it is not satisfactory as a short-stop in cold rubber polymerization processes where a more powerful initiator, as for example, a hydroperoxide, is used. Dinitrochlorobenzene has been used in cold rubber processes, but it has the severe disadvantage of causing discoloration of the rubber and it is also water insoluble and quite toxic to workers in the plant. Alkali metal salts, such as the sodium salts of dithiocarbamates, and particularly sodium dimethyldithiocarbamate, have been used quite successfully in both hot and cold polymerization recipes, but such compounds have the disadvantage of causing some polymer discoloration and of being oxidized to a thiuramdisulfide which remains in the finished rubber and causes undesirable and uncontrollable variation in vulcanization rate. Sodium dimethyldithiocarbamate has also been used in combination with sodium polysulfide, but this stopping agent combination also has many disadvantages such as line plugging due to incomplete water solubility and the combination also causes equipment corrosion and discoloration of the polymer product.

It has now been found that an extremely desirable stopping agent for both hot and cold emulsion polymerization systems is obtained by employing as stopping agent the compound diethylaniline N-oxide. It is particularly surprising that this compound is an effective stopping agent since related compounds are not effective for this purpose. For example, dimethylaniline N-oxide, the first member of the homologous series, is not an effective short-stop nor even is a nitro-substituted diethylaniline N-oxide. Thus, it is indeed surprising to find that diethylaniline N-oxide is a highly effective stopping agent useful in industrial polymerization processes.

Diethylaniline N-oxide is a known compound which may be made according to the method of Huisgen et al. (Ber. 92, 3223 (1959)).

In carrying out the process of the invention, conventional polymerization recipes will be employed and the short-stop will be added in the usual manner. Hot synthetic rubber recipes (persulfate or azonitrile initiated) or cold synthetic rubber recipes (hydroperoxide initiated) may be used. The polymerizable material for preparing synthetic rubber latices will preferably be a butadiene based system, e.g., butadiene-1,3 together with a styrene or related styrene copolymer (e.g., alpha-methylstyrene). However, the short-stopper used in this invention may be employed with any ethlenically unsaturated monomer system.

The amount of short-stop that will be used will vary from about 0.01 to 0.20 p.h.m. (parts per hundred parts of monomer). The manner by which the short-stop will be added will be in accord with conventional techniques used in rubber polymerization processes. Preferably an aqueous solution of the short-stop will be added to the polymerization reaction mass when the desired conversion is obtained.

In order to further illustrate the invention, comparative tests are described in the following paragraphs. These test evaluations are carried out by using an emulsion polymerization system contained in capped 7 oz. beverage bottles agitated by being turned end over end in a constant temperature bath by means of a rotating shaft. The test recipe was a standard styrene-butadiene rubber recipe having the following compositions.

| Ingredients: | Quantity per 7 oz. bottle |
|---|---|
| Butadiene | 18 |
| Styrene | 7 |
| Deionized water | 50 |
| t-Dodecyl mercaptan | 0.058 |
| Potassium salt of disproportionated rosin acids ("Dresinate" 515) | 1.125 |
| Sodium salt of polymerized alkyl naphthaline sulfonate ("Daxad" 11) | 0.038 |
| Tetrasodium salt of ethylene diamine tetraacetic acid sequestering agent ("Versene" 100) | 0.008 |
| p-Menthane hydroperoxide | 0.011 |
| $FeSO_4 \cdot 7H_2O$ | 0.0056 |
| $Na_3PO_4 \cdot 12H_2O$ | 0.26 |
| Sodium sulfoxylate formaldehyde | 0.0169 |

A load of bottles were tumbled at 5° C. in a polymerizer and when about 55% conversion was reached the stopping agents were injected through a self-sealing synthetic rubber liner in the perforated cap. One bottle in each series was not stopped and served as a control. After injection of stopping agents into the bottles they were tumbled in the polymerizer for one more hour at 5° C. after which the latices were sampled for percent conversion. The bottles were then tumbled in the polymerizer at 50° C. and percent conversion for each bottle was determined after 18 hours and after 24 hours of heating. An effective stopping agent will stop polymerization of the recipe completely even during the extended period of heating at 50° C. for 24 hours.

The following table illustrates the results obtained with diethylaniline N-oxide and related compounds.

TABLE I.—EVALUATION OF AROMATIC AMINE N-OXIDES AS STOPPING AGENTS

| Stopping agent | Concentration, p.h.m. | When stopped | After— 1 hour at 5° C. | 6 hours at 50° C. | 24 hours at 50° C. |
|---|---|---|---|---|---|
| Series I: | | | | | |
| 1. Sodium dimethyldithiocarbamate, control | 0.15 | 53.2 | | 51.3 | 51.1 |
| 2. Diethylaniline N-oxide | 0.15 | 53.2 | 52.8 | 51.3 | 51.4 |
| Series II: | | | | | |
| 1. Sodium dimethyldithiocarbamate, control | 0.15 | 52.2 | | 50.0 | 48.6 |
| 2. Diethylaniline N-oxide | 0.15 | 52.2 | 49.9 | 50.5 | 46.7 |
| 3. Dimethylaniline N-oxide hydrochloride | 0.15 | 52.2 | 56.3 | 88.6 | 94.5 |
| 4. Dimethylaniline N-oxide | 0.15 | 52.2 | 55.0 | 83.5 | 97.5 |
| Series III: | | | | | |
| 1. Sodium dimethyldithiocarbamate, control | 0.15 | 53.8 | | 53.6 | 51.2 |
| 2. O-nitro diethylaniline N-oxide | 0.15 | 53.8 | 53.2 | 66.0 | 66.5 |
| 3. p-Nitrodimethylaniline N-oxide | 0.15 | 53.8 | 55.0 | 65.0 | 72.8 |
| 4. Blank | | | 72.7 | 98.0 | 98.2 |

As can be seen from the above data, diethylaniline N-oxide is an effective stopping agent, but dimethylaniline N-oxide is not. Likewise, a nitro-substituted diethylaniline N-oxide and a nitro-substituted dimethylaniline N-oxide are ineffective.

It will be understood that numerous changes may be made to the above description and examples without departing from the spirit and scope of the invention.

We claim:

1. In the process of preparing a synthetic rubber latex by free radical polymerizing conjugated diolefin and terminating the polymerization by the addition of a stopping agent, the improvement which comprises using a stopping amount of diethylaniline N-oxide as said stopping agent.

2. A process as in claim 1 wherein the conjugated diolefin is butadiene.

3. A process as given in claim 1 wherein the conjugated diolefin is butadiene and is copolymerized with styrene and the polymerization is terminated by the addition of 0.01 to 0.2 part of diethylaniline N-oxide per hundred parts of monomer.

4. A process as in claim 1 wherein the polymerization is a persulfate or azonitrile initiated polymerization process.

5. A process as in claim 1 where the polymerization is a hydroperoxide initiated polymerization process.

References Cited

UNITED STATES PATENTS

| 2,687,442 | 8/1954 | Claver | 260—666.5 |
| 3,047,579 | 7/1962 | Witman | 260—666.5 |
| 3,222,334 | 12/1965 | Demme | 260—84.7 |

OTHER REFERENCES

Dunbrook et al.—644 O. G. 622, Mar. 13, 1951.

JAMES A. SEIDLECK, Primary Examiner

U.S. Cl X.R.

260—29.7, 83.7, 84.7, 94.2, 94.4, 94.6, 666.5